US012179240B2

(12) United States Patent
Genze

(10) Patent No.: US 12,179,240 B2
(45) Date of Patent: Dec. 31, 2024

(54) CLEANING APPARATUS

(71) Applicant: ECOCLEAN GMBH, Filderstadt (DE)

(72) Inventor: Alexander Genze, Simmerath (DE)

(73) Assignee: ECOCLEAN GMBH, Filderstadt (DE)

( * ) Notice: Subject to any disclaimer, the term of this patent is extended or adjusted under 35 U.S.C. 154(b) by 545 days.

(21) Appl. No.: 17/519,681

(22) Filed: Nov. 5, 2021

(65) Prior Publication Data

US 2022/0055075 A1 Feb. 24, 2022

Related U.S. Application Data

(63) Continuation of application No. PCT/EP2020/062825, filed on May 8, 2020.

(30) Foreign Application Priority Data

May 8, 2019 (DE) ......................... 102019112044.6

(51) Int. Cl.
*B08B 5/02* (2006.01)
*A47L 9/16* (2006.01)
(Continued)

(52) U.S. Cl.
CPC .............. *B08B 5/02* (2013.01); *A47L 9/1608* (2013.01); *A47L 9/165* (2013.01); *A47L 9/1691* (2013.01); *B08B 5/04* (2013.01); *B08B 7/02* (2013.01)

(58) Field of Classification Search
CPC .... B08B 5/02; B08B 5/04; B08B 7/02; B08B 5/00; B08B 3/02; B08B 13/00; A47L 9/1608; A47L 9/165; A47L 9/1691
See application file for complete search history.

(56) References Cited

U.S. PATENT DOCUMENTS 7,272,871 B1 * 9/2007 Mudd ..................... A47L 9/106 55/432
2007/0283980 A1 12/2007 Okamoto et al.
(Continued)

FOREIGN PATENT DOCUMENTS

DE 3434998 4/1986
DE 19532576 3/1997
(Continued)

OTHER PUBLICATIONS

English Translation of the International Preliminary Report on Patentability for International (PCT) Patent Application No. PCT/EP2020/062825, dated Nov. 18, 2021, 11 pages.
(Continued)

*Primary Examiner* — David Redding
(74) *Attorney, Agent, or Firm* — Sheridan Ross P.C.

(57) ABSTRACT

The invention relates to a cleaning apparatus for cleaning, in particular, electrical components by means of a gaseous cleaning medium, comprising a cleaning chamber with an inner space and a wall arrangement enclosing same, a receptacle for the component in the inner space and a flow device for the cleaning medium, which comprises a pressurization device and comprises or forms at least one inlet into the inner space and at least one outlet from the inner space, wherein a pressure difference between the at least one inlet and the at least one outlet is providable by means of the flow device, and wherein the flow device is formed such that the cleaning medium forms a vortex flow at least in sections in the inner space from the at least one inlet to the at least one outlet.

24 Claims, 6 Drawing Sheets

(51) Int. Cl.

| | |
|---|---|
| ***B08B 5/04*** | (2006.01) |
| ***B08B 7/02*** | (2006.01) |

(56) References Cited

U.S. PATENT DOCUMENTS

| | | | |
|---|---|---|---|
| 2014/0007371 | A1 | 1/2014 | Lu et al. |
| 2021/0146408 | A1 | 5/2021 | Genze |

FOREIGN PATENT DOCUMENTS

| | | |
|---|---|---|
| DE | 102013105141 | 12/2014 |
| DE | 202013012237 | 10/2015 |
| DE | 202018100550 | 2/2018 |
| EP | 0506171 | 9/1992 |
| EP | 2135687 | 12/2009 |
| WO | WO 2020/021109 | 1/2020 |

OTHER PUBLICATIONS

International Search Report and Written Opinion for International (PCT) Patent Application No. PCT/EP2020/062825, dated Aug. 24, 2020, 12 pages.

English Translation of the International Search Report for International (PCT) Patent Application No. PCT/EP2020/062825, dated Aug. 24, 2020, 3 pages.

* cited by examiner

CLEANING APPARATUS

CROSS-REFERENCE TO RELATED APPLICATIONS

This application is a continuation application of international application number PCT/EP2020/062825, filed on May 8, 2020, and claims the benefit of German application number 10 2019 112 044.6, filed on May 8, 2019, which are incorporated herein by reference in their entirety and for all purposes.

FIELD OF THE INVENTION

The present invention relates to a cleaning apparatus for cleaning, in particular, electrical components by means of a gaseous cleaning medium.

BACKGROUND OF THE INVENTION

Electrical components, for example for electrical circuits or electric motors, may have sensitive assemblies, for example assemblies comprising circuit boards, which have to be specifically cleaned during and/or after production. For example, particulate contamination that can lead to electrical short circuits and breakdowns in the operation of the components and is responsible for the failure of electrical components must be removed. A dry cleaning by means of a gaseous (gas or gas mixture) cleaning medium is desirable, a targeted cleaning of the components being advantageous.

It is known to blow off electrical components by means of compressed air and to remove particles from same.

An object underlying the present invention to provide a cleaning apparatus for cleaning, in particular, electrical components, which has an improved cleaning performance.

SUMMARY OF THE INVENTION

In an aspect of the invention, a cleaning apparatus for cleaning, in particular, electrical components by means of a gaseous cleaning medium, comprises a cleaning chamber with an inner space and a wall arrangement enclosing same, a receptacle for the component in the inner space and a flow device for the cleaning medium. The flow device comprises or forms a pressurization device and at least one inlet into the inner space and at least one outlet from the inner space. A pressure difference between the at least one inlet and the at least one outlet is providable by means of the flow device. The flow device is formed such that the cleaning medium forms a vortex flow at least in sections in the inner space from the at least one inlet to the at least one outlet.

BRIEF DESCRIPTION OF THE DRAWINGS

The foregoing summary and the following description may be better understood in connection with the drawings figures of which.

DETAILED DESCRIPTION OF PREFERRED EMBODIMENTS OF THE INVENTION

Figure 1:
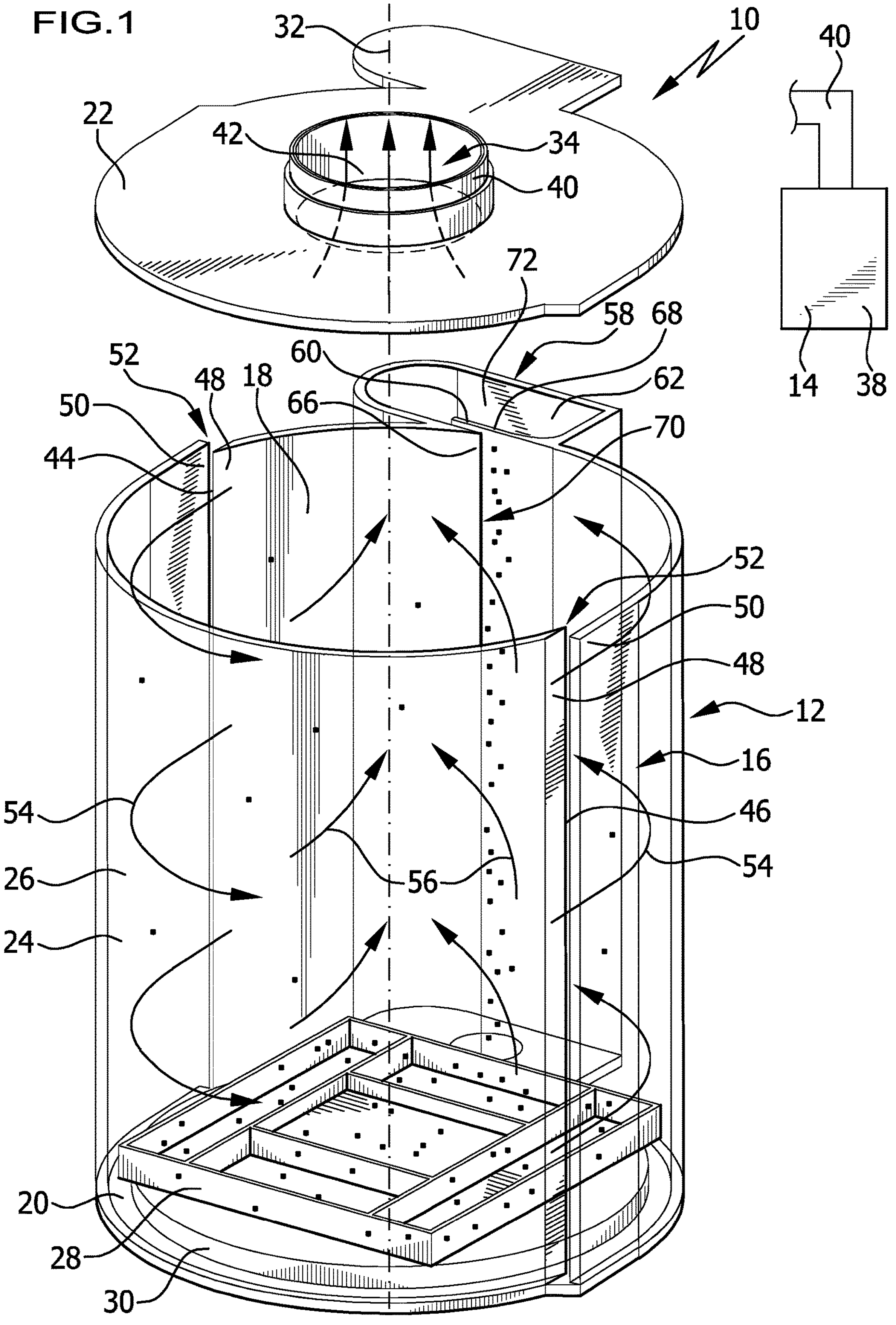
FIG. 1: shows a perspective schematic depiction of a cleaning apparatus in accordance with the invention in an exploded depiction.

Although the invention is illustrated and described herein with reference to specific embodiments, the invention is not intended to be limited to the details shown. Rather, various modifications may be made in the details with the scope and range of equivalents of the claims and without departing from the invention.

The present invention relates to a cleaning apparatus for cleaning, in particular, electrical components by means of a gaseous cleaning medium, comprises a cleaning chamber with an inner space and a wall arrangement enclosing same, a receptacle for the component in the inner space and a flow device for the cleaning medium, which comprises or forms a pressurization device and at least one inlet into the inner space and at least one outlet from the inner space, wherein a pressure difference between the at least one inlet and the at least one outlet is providable by means of the flow device, and wherein the flow device is formed such that the cleaning medium forms a vortex flow at least in sections in the inner space from the at least one inlet to the at least one outlet.

By means of the flow device, in particular the pressurization device thereof, a pressure difference between the at least one inlet and the at least one outlet can be provided. This can presently be achieved, in particular, by the pressurization device being configured to generate an underpressure in the inner space by suctioning by way of the at least one outlet and/or to generate an overpressure in the inner space by way of the at least one inlet. In the inner space, a flow of the cleaning medium forms as a result of the pressure difference, said flow in the present case extending in the shape of a vortex at least in sections. It is shown in practice that particulate contamination adhering to surfaces of electrical components can be struck particularly well by the vortex flow and removed from the component. An improved cleaning result can be achieved in this way.

It may be advantageous if the cleaning chamber is of cylindrical or substantially cylindrical configuration, in particular in the form of a vertical cylinder and/or a circular cylinder, wherein the wall arrangement comprises a base wall, a top wall, and a circumferential side wall, and the cylinder is extended, in particular, from the base wall to the top wall.

For example, a cleaning chamber with an elliptical basic form may be advantageous. For example, the chamber cross section is elliptical and a cylinder extended from the base wall to the top wall is provided.

The base wall, the top wall, and/or the side way may each be of multi-part or one-part configuration. Depending on the arrangement and/or quality of the at least one inlet and/or the at least one outlet, provision may be made that the base wall, the top wall, and/or the side wall is interrupted in sections and is subdivided into segments.

A diameter of the cleaning chamber may be, e.g., about 5 cm to 100 cm, preferably about 10 cm to 50 cm. Provision may be made that the diameter is variable or different over the height or extent of the cleaning chamber.

A height of the cleaning chamber may preferably be up to about 150 cm, preferably about 10 cm to 100 cm.

The cleaning chamber, in particular the wall arrangement thereof, is preferably made of electrically conductive material in order to prevent electrostatic charges, for example due to particle friction, and thus electrostatic discharges.

The cleaning chamber, in particular the wall arrangement, may preferably be made of an abrasion-resistant material and be of durable quality, for example made of metal or a plastics material like PEEK.

Facing toward the inner space, the wall arrangement is advantageously of smooth configuration in order to prevent the adhesion of particles, for example by means of a coating or in the manner of a "sharkskin".

It may be advantageous if the receptacle is arranged on a wall of the cleaning chamber, in particular on a base wall, the wall being opposite to a wall in which the at least one outlet is formed.

Indications of orientation and position like "base wall" or "top wall" are presently to be interpreted in relation to an intended use of the cleaning apparatus, wherein the base wall is arranged at the bottom on the cleaning chamber in relation to the direction of gravity.

The at least one outlet is preferably formed centrally in a wall of the cleaning chamber, in relation to an axis defined by the cleaning chamber, and/or the at least one outlet can be flowed through axially by the exiting cleaning medium, in relation to the aforementioned axis.

Provision may be made that a plurality of outlets is provided.

The at least one outlet may, e.g., be formed in the wall eccentrically at a distance in relation to the axis.

At least one outlet may be formed in a top wall. At least one outlet may be formed in a base wall. At least one outlet may be formed in a side wall of the cleaning chamber. For example, at least one outlet is integrated tangentially into a side wall of the cleaning chamber.

Provision may be made that a flow channel of the flow device, for example in the form of a dip tube, projects through the at least one outlet into the inner space.

The pressurization device is or comprises, in particular, a suction assembly in order to act upon the inner space with underpressure through the at least one outlet. In the case of a plurality of outlets, a plurality of underpressure-generating devices are provided, which are associated with a respective outlet.

The relative underpressure in the inner space may be, e.g., up to about 1000 mbar, and it is advantageously from about 5 mbar to about 300 mbar.

The cross section for the application of underpressure, for example the cross section of the at least one outlet, may be variable, for example manually or automatically without intervention by the user.

A time-dependent application of the inner space with a pressure difference may be provided. For example, a frequency-dependent control of the pressurization device is provided, in particular with a view to a pulsed application of pressure.

At least one of the following may be connected between the at least one outlet and the pressurization device, for example in a flow channel:

- a filter element, for example a dust filter element or configured as a cyclone;
- a gas separator, for example by means of absorption filtration and/or a gas scrubber;
- a storage device for underpressure, which, for example, can be selectively released in order to act upon the inner space with underpressure;
- a condenser, for example for attracting particulate charged contamination;
- a sensor device for examining the state of the suctioned cleaning medium, which sensor device may comprise, e.g., a particle detector, a gas detector, a differential pressure sensor, and/or a volume flow sensor.

Provision may be made that the pressurization device is or comprises an overpressure device, which acts upon the inner space with pressurized cleaning medium by way of the at least one inlet. It is understood that the components described above may be provided on or in the flow channel even in the absence of the underpressure generating device.

In a preferred embodiment, the at least one inlet may be arranged or formed on a side wall of the cleaning chamber. The side wall may, for example, form a shell of the cleaning chamber.

A plurality of inlets may be provided, for example two or more inlets, for example six inlets. A plurality of inlets may be positioned at uniform angular distances from one another in relation to an axis of the cleaning chamber. For example, two inlets are provided, which are positioned diametrically opposed to one another in relation to an axis of the cleaning chamber.

The at least one inlet may, for example, be of slit-shaped configuration. Provision may be made that the cross section of the inlet, in particular the slit width, is different over the extent of the inlet and, in particular, may be variable.

A manual or automatic setting of the opening cross section of the at least one inlet may be provided.

Alternatively to the slit-shaped configuration of the inlet, for example, a round form of the inlet may be provided, in particular a circular form or an elliptical form. It is understood that inlets of different cross sections may be provided.

In a preferred embodiment, the at least one inlet can be flowed through tangentially by the entering cleaning medium, in relation to an axis defined by the cleaning chamber. Alternatively, an angle of the inflowing cleaning medium relative to a tangent of about +/−45° may be provided.

The at least one inlet may, for example, be extended axially in relation to the axis of the cleaning chamber.

For example, the at least one inlet extends substantially from a base wall to a top wall of the cleaning chamber, wherein the receptacle is arranged, e.g., on the bottom wall and the at least one outlet is arranged or formed, e.g., on the top wall.

In a preferred embodiment, provision may be made that at least one inlet is arranged or formed in a base wall and/or at least one inlet is arranged or formed in a top wall of the cleaning chamber.

It proves to be favorable if the flow of the cleaning medium in the inner space runs along the wall arrangement of the cleaning chamber. This can advantageously be achieved in a constructively simple manner by a tangential inflow of the cleaning medium into the inner space.

Alternatively or in addition, provision may be made that the flow runs centrally in the inner space around an axis of the cleaning chamber.

The flow of the cleaning medium may advantageously have at least one directional component along an axis of the cleaning chamber or in parallel to said axis, in particular in the case of axial suction through the at least one outlet.

A concentric arrangement of individual flows around an axis of the cleaning chamber may be provided, which can be achieved, for example, by means of a plurality of inlets.

Provision may be made that the flow of the cleaning medium in the inner space is of helical configuration, in particular around an axis of the cleaning chamber.

It is favorable if the cleaning apparatus comprises a separating device for particles detached from the component and carried by the cleaning medium. The separating device makes it possible to remove particles from the flowing cleaning medium in a targeted manner and to collect same.

At least one outlet opening for particles is advantageously formed in the wall arrangement, by way of which outlet opening the inner space opens into a separation space for the particles. The particles can travel through the at least one outlet opening into the separation space and be collected therein.

The at least one outlet opening is, for example, formed by a step in the wall arrangement as a result of two portions of the wall arrangement that are at a distance from one another.

Provision may be made that more than one outlet opening is present, for example two or more outlet openings. In a preferred embodiment, for example, six outlet openings may be present.

The at least one outlet opening is preferably arranged or formed on a side wall of the cleaning chamber. The side wall forms, in particular, a shell of the cleaning chamber.

Alternatively or in addition, at least one outlet opening may be formed in a top wall and/or at least one outlet opening may be formed in a base wall of the cleaning chamber.

The at least one outlet opening is, e.g., of slit-shaped configuration. Provision may hereby be made that a cross section of the outlet opening is variable or non-constant over the length of the slit.

Overall, it is conceivable that a cross section of at least one outlet opening is variable, for example manually or automatically. For example, the width of the slit that arises as a result of the aforementioned step may be settable. A manually or automatically settable step width, a manual or automatically settable step offset in the flow direction of the particles through the outlet opening is conceivable. The step, in particular the slit-shaped outlet opening, may be contoured, for example.

Aforementioned embodiments advantageously favor the form of the outlet opening, in particular the step on the wall arrangement to the inner space, in order to achieve a direction change of the flow of cleaning medium that is as favorable to flow and low-turbulence as possible, with a view to a targeted discharge of the particles.

The offset that is formed by the aforementioned step may be, e.g., up to about 25 mm, preferably about 1 mm to 10 mm.

The at least one outlet opening, e.g., with a slit-shaped form and, in particular, formed by the aforementioned step, may, for example, be continuous or, alternatively, interrupted. In the latter case, for example, a plurality of (partial) outlet openings arranged laterally next to one another are provided. The cross section of the continuous or, alternatively, the interrupted outlet opening(s) may be constant, for example with equal offset width of the step, or be variable, for example with variable offset width of the step.

Provision may be made that the at least one outlet opening can be flowed through tangentially by the particles, in relation to an axis defined by the cleaning chamber.

Provision may be made that the at least one outlet opening is extended axially in relation to the axis of the cleaning chamber.

Provision may be made that the cleaning medium does not flow through the at least one outlet opening or flows through the at least one outlet opening only to an insignificant extent. For example, the particles are thrown through the outlet opening into the separation space in which an atmospheric pressure is present, whereas the cleaning medium is suctioned via the outlet by means of the pressurization device. In this way, a separation can preferably take place, the particles being removed from the cleaning medium. This can prove to be advantageous, for example, when the cleaning medium could pose possible dangers, which is why the suction is advantageous.

The separating device is favorably of inertia-based and/or filterless configuration.

It is advantageous if the separating device is configured such that the kinetic energy of the particles can be dissipated in a short distance and/or in a short amount of time and the particles remain trapped in the separation space. The risk of possible particles reentering the inner space can be reduced in this way.

The aforementioned purpose is achieved, for example, by a structured surface of the flowed-through regions of the separating device with a relatively high friction coefficient, making it possible to decelerate the particles. Alternatively or in addition, a relatively soft material may be provided for the separating device.

An impact body is favorably provided, for example a baffle plate, against which the particles can impact. The impact body is preferably aligned non-parallel to the inflow plane and serves to redirect the particles.

A disruptive body for the particles may favorably be provided at the at least one outlet opening and/or in the separation space, which substantially prevents a backflow into the inner space.

As described above, kinetic energy of the particles can advantageously be reduced in the separation space.

The separating device favorably comprises a collection container for particles. Here, it is favorable if the particles are able to enter the collection container by means of gravity. For this reason, the collection container is advantageously arranged at the bottom of the separation space in the direction of gravity.

The collection container can favorably be released from the cleaning chamber. For this purpose, e.g., quick-release locks are provided. A manual and, in particular, toolless disassembly of the collection container is advantageous.

Alternatively or in addition, an apparatus for discharging particles from the separation space and in particular the collection container may be provided. For example, the use of a sensor device is conceivable in order to determine a filling level of particles. Alternatively or in addition, a time-controlled or component-controlled discharge of particles may be used.

A discharge of particles is possible, for example, by suction and/or by mechanical discharge. In the latter case, e.g., a scraper or a screw conveyor is used to mechanically remove the particles.

In a preferred embodiment of the cleaning apparatus, provision may be made that the at least one outlet is arranged on the separating device and is formed, e.g., in a wall arrangement of the separating space. For example, the pressurization device sucks the cleaning medium through the separating device out of the inner space.

Provision may be made that the at least one outlet opening forms the at least one outlet or vice versa.

It is favorable if the cleaning apparatus comprises an adjusting device for moving the component. For example, the component can be moved and, in particular, displaced in at least one spatial direction. Alternatively or in addition, a rotation or pivoting of the component about at least one axis of rotation or a pivot axis is conceivable.

A vibration device for vibrating the component indirectly or directly (for example by way of a support element of the receptacle) is preferably advantageous. As a result of the vibration, adhering particles can be detached from the surface of the component. There is favorably a vibration decoupling from the rest of the cleaning apparatus during vibration.

The adjusting device and/or the vibration device are arranged, e.g., on a base wall of the cleaning chamber, on which the receptacle is positioned. Provision may be made, for example, that the base wall is rotatable by means of the adjusting device. The setting, manually or automatically, of a rotation frequency of the base wall is conceivable.

It may be advantageous, in particular with the receptacle arranged on the base wall, if the base wall is detachable from the rest of the wall arrangement, for example manually and/or toollessly. By detaching the base wall, the receptacle can be freed for the purpose of exchanging the component.

The exchange of the component takes place manually, for example. Alternatively or in addition, an exchange of the component by machine may be provided, for example by means of a robot. An exchange of interlinked components, for example in the manner of an assembly line, is conceivable.

Provision may be made that the component is fixable to the receptacle, for example by force-locking and/or positive-locking connection. For example, the component is clamped to the receptacle. The fixing of the component to the receptacle may take place manually or automatically, for example. A quick clamping device may be provided.

In a preferred embodiment of the cleaning apparatus, a circulation operation for the cleaning medium may be provided. For example, cleaning medium flowing out via the at least one outlet is cleaned by means of a filter element, is redirected, and is conducted back into the inner space by way of the at least one inlet.

It is favorable if it is possible to act upon the component with a cleaning medium in a targeted manner. The cleaning apparatus may therefore have an application device, for example in the form of a nozzle device or comprising a nozzle device. The fluidic cleaning medium may be gaseous, and/or a liquid cleaning medium may be provided.

The cleaning apparatus advantageously comprises a nozzle device with at least one nozzle element arranged in the receiving space, which can be acted upon with a preferably gaseous cleaning fluid, wherein the at least one nozzle element is preferably directed or directable at the component. By means of the nozzle device, contamination of the component can be acted upon in a targeted manner and be removed from said component.

An adjusting device for moving the nozzle device relative to the component is advantageously provided. For example, the adjusting device is configured for a translational and/or rotational movement of the nozzle device.

A relative movement of the component and the nozzle device may be favorable, each carrying out a rotation and the axes of rotation differing from one another. For example, the axes of rotation may be aligned in parallel to one another. As a result of the resulting overlapping movement, a comprehensive cleaning by means of the cleaning fluid can be carried out.

At least one of the following media may be provided for the cleaning fluid:

- compressed air, optionally ionized;
- oil-free and/or filtered cleaning medium;
- $CO_2$;
- gaseous cleaning medium, for example ozone, nitrogen etc.;
- steam;
- inorganic cleaning medium, preferably water;
- organic cleaning medium and in particular solvent like, for example, isopropanol.

The use of particles in the flow of the cleaning fluid is conceivable.

Discharge electrodes (DC and/or AC) may be provided. Surrounding blowing air for increasing the effective depth of the cleaning electrodes may be used with the discharge electrodes.

In the inner space, the cleaning apparatus may advantageously comprise at least one mechanical cleaning tool for mechanically cleaning the component. For example, a towel- or sponge-like cleaning tool may be provided. Same may optionally be wetted or impregnated with a cleaning fluid. In addition to cleaning the component, for example, the cleaning apparatus can be prepared for reuse.

Further forms of mechanical cleaning of the component include the use of at least one brush, at least one forceps, and/or at least one milling cutter.

A plasma generating device may be provided in order to enable a plasma-based cleaning of the component in the inner space.

The already mentioned nozzle device may be configured in a variety of ways. For example, nozzle elements in the form of flat jet nozzles, full jet nozzles, round jet nozzles, shell jet nozzles, or nozzle lances are provided. The nozzle elements may have angled outlet openings, which may be manually and/or automatically settable. Nozzle elements with multiple openings may be provided.

The nozzle device may be rigid and immovable relative to the component. As already mentioned, alternatively, a nozzle device that is movable by means of the adjusting device may be provided. The adjusting device is, for example, pneumatically or electrically driven. A drive by means of the pushback from the exiting cleaning fluid is conceivable.

In a preferred embodiment, a robot-like or robotic adjusting device, for example in the form of a so-called “delta robot”, is used to move the nozzle device, which preferably enables at least a three-axis adjustment. A Cartesian portal for moving the nozzle device about, e.g., one axis to three axes may be provided. Alternatively or in addition, a “Scara” or articulated robot may be provided.

A supply of cleaning fluid for targeted application may take place, e.g., by way of inlet openings in the wall arrangement, for example the bottom wall, the side wall, and/or the top wall.

The application device may, for example, be entirely or partially generatively manufactured, in particular by means of 3D printing.

The receptacle for the component may be generatively manufactured, for example by means of 3D-printing.

The cleaning apparatus may be of stationary or moveable configuration, for example by means of rollers.

A detection unit may be provided for examining the quality of the cleaning. For example, a fluorescence measurement of the flowing cleaning medium, a particle detection, and advantageously a monitoring of the cleaning result is conceivable. For this purpose, for example, a before/after comparison of the initial state of the component and the cleaned state of the component can be performed by means of a detection unit.

The detection unit is, in particular, of optical configuration and comprises, e.g., at least one camera.

The cleaning apparatus may be ESD compliant and/or explosion-proof.

An automatic tracking of components in advantageous.

The control of the cleaning apparatus may be autonomous.

A sound insulation device for the cleaning apparatus may be provided. For example, a sound insulation casing for the cleaning chamber may be present.

The sound insulation device may have, e.g., a filter element for cleaning the suctioned air.

The cleaning apparatus in accordance with the invention can be used with components of various kinds, but is particularly suited for electrical components. For example, said components may be components for electric motors like coil bodies, housings, bearings, or shafts, alternatively components for power electronics or electrical circuit boards.

Figure 2:
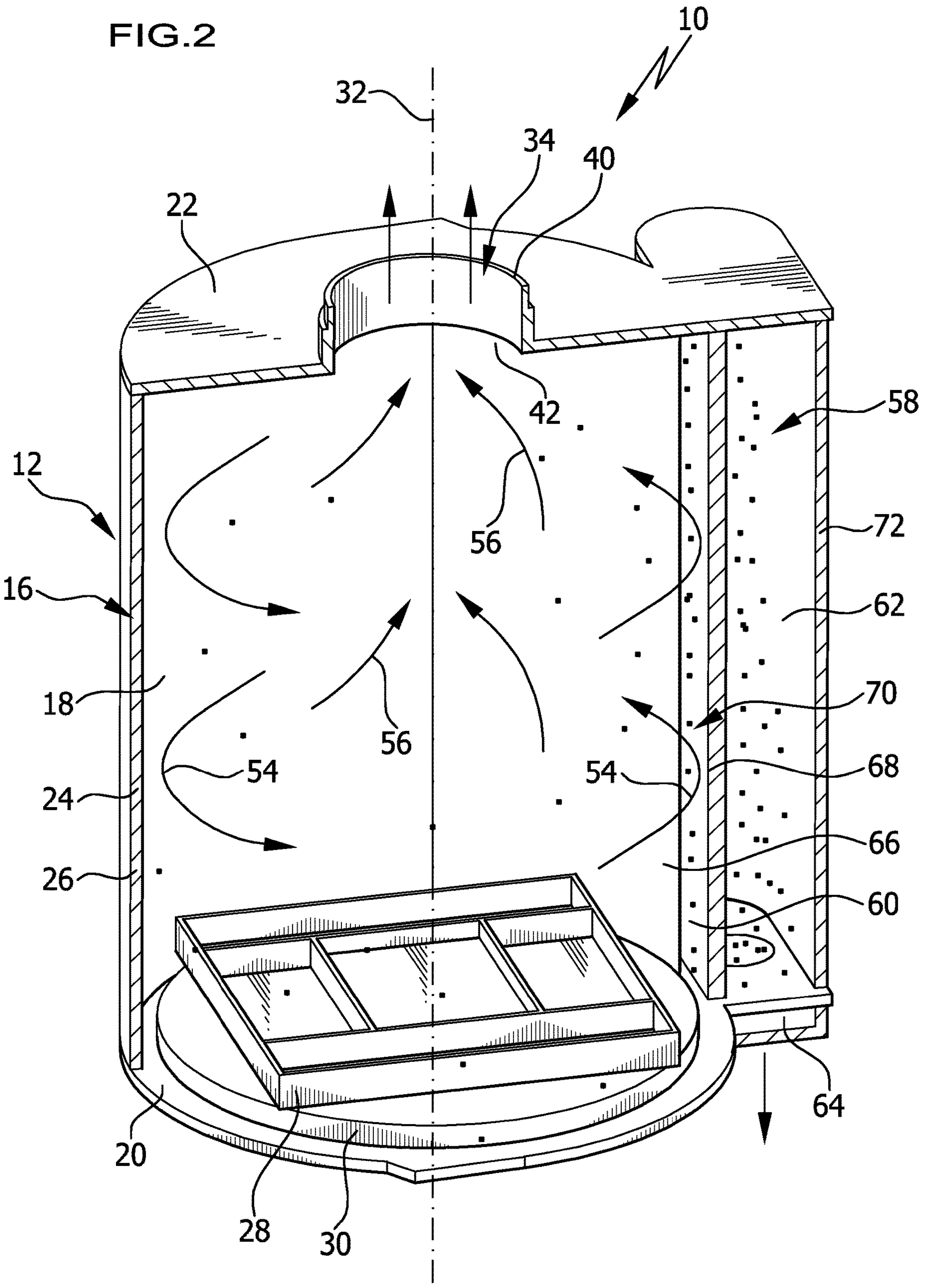
FIG. 2: shows a partial depiction of the cleaning apparatus from FIG. 1, partially cut.
Figure 3:
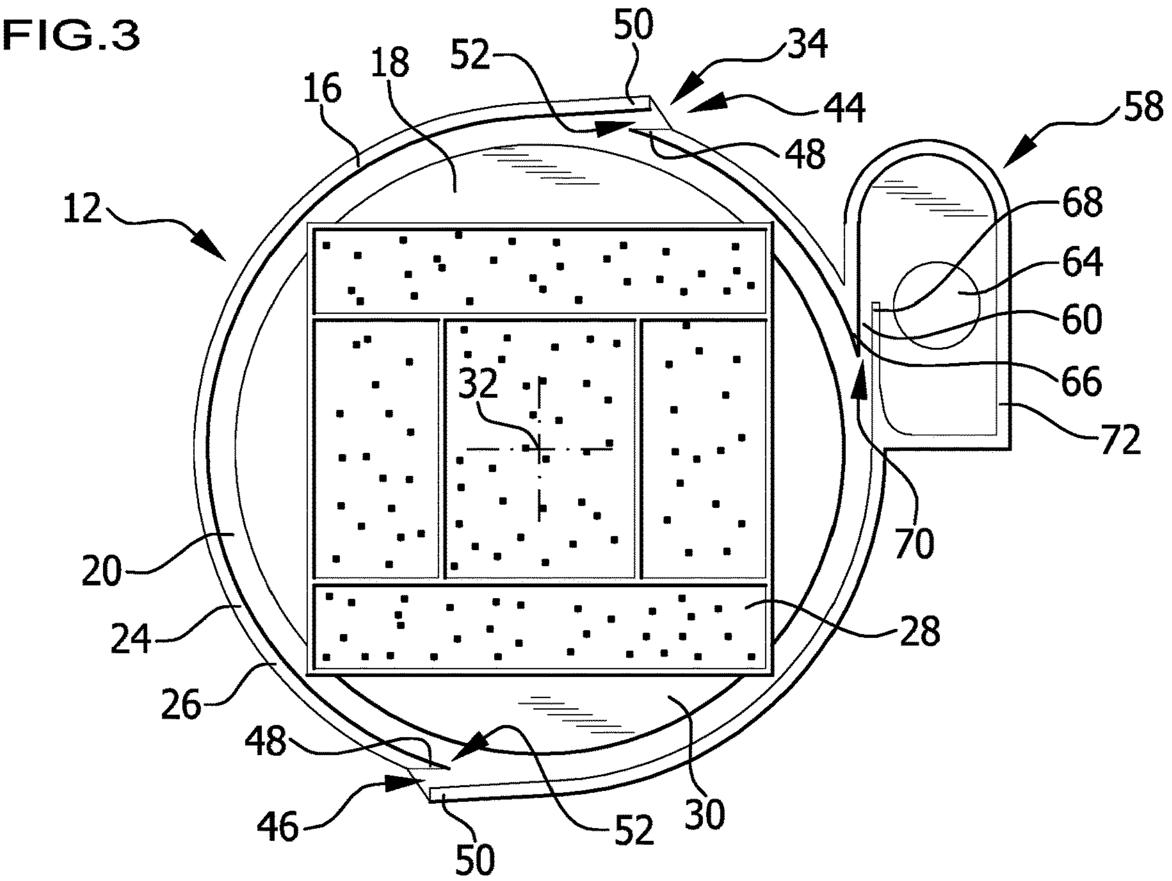
FIG. 3: shows a cleaning chamber of the cleaning apparatus from FIG. 1 in the opened state as viewed toward a component to be cleaned.
Figure 4:
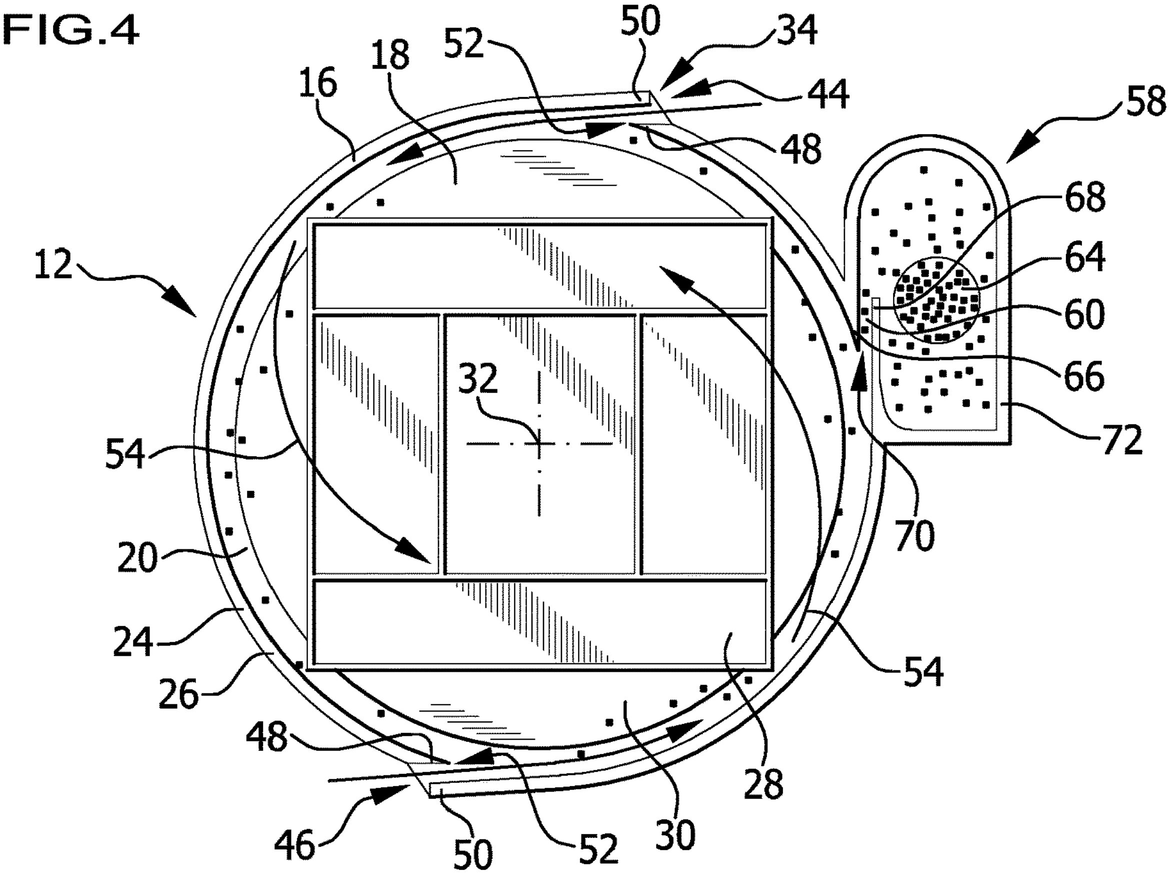
FIG. 4: shows a depiction corresponding to FIG. 3 during the cleaning operation.

The drawing shows in FIGS. 1 to 4 an advantageous embodiment of a cleaning apparatus in accordance with the invention, denoted as a whole with the reference numeral 10, of which only a cleaning chamber and a separating device are depicted in FIGS. 2 to 4.

The cleaning apparatus 10 comprises the already mentioned cleaning chamber 12 and a pressurization device 14.

The cleaning chamber 12 comprises a wall arrangement 16 and an inner space 18 enclosed by said wall arrangement 16.

In the present case, the cleaning chamber 12 is substantially of a cylindrical basic form, in particular the form of a vertical circular cylinder.

The cleaning chamber 12 comprises a base wall 20, a top wall 22 opposite said base wall 20, and a circumferential side wall 24 that forms a shell 26. The base wall 20, the top wall 22, and a the side wall 24 together form the wall arrangement 16.

A component to be cleaned, in particular an electrical component, can be positioned on a receptacle 30 and be releasably fixed thereto. The receptacle 30 is presently arranged on the base wall 20 and can, for example, be formed thereby.

The cleaning chamber 12 defines an axis 32, said axis being an axis of the cylinder.

The cleaning apparatus 10 comprises a flow device 34 for a cleaning medium, which presently is, in particular, gaseous, for cleaning the component 28. The flow device 34 comprises the pressurization device 14. In the present case, the pressurization device 14 is configured as a suction assembly 38. By means of the suction assembly 38, the inner space 18 can be acted upon with underpressure. For this purpose, a flow channel 40 is provided (schematically depicted in FIG. 1). The flow channel 40 provides a flow connection from the suction assembly 38 to the inner space 18.

The flow device 34 comprises an outlet 42 for discharging cleaning medium from the inner space 18. The flow channel 40 is connected to the outlet 42 and connects same to the suction assembly 38, such that the application of underpressure on the inner space 18 takes place by way of the outlet 42.

In the present case, the outlet 42 is formed in the top wall 22 and is arranged centrally in relation to the axis 32. The cleaning medium can flow axially through the outlet 42.

The flow device 34 further comprises at least one inlet for cleaning medium suctioned by the suction assembly 38. The cleaning medium can flow via the inlet into the inner space 18. For example, the cleaning medium is suctioned from the environment. Said cleaning medium is, in particular, air.

Presently two inlets 44, 46 are provided. The inlets 44, 46 are formed on the side wall 24. For forming a respective inlet 44, 46, the side wall 24 has portions 48, 50 arranged radially at a distance from one another, between which a step 52 is formed.

The inlets 44, 46 are slit-shaped and presently extend from the base wall 20 to the top wall 22. Here, the inlets 44, 46 are aligned axially.

The inlets 44, 46 are positioned diametrically opposed to one another in relation to the axis 32. This is clear, in particular, in FIGS. 3 and 4.

As a result of being acted upon by the pressurization device 14, a pressure difference between the inlets 44, 46 and the outlet 42 arises in the inner space 18. Due to the pressure difference, a flow of the cleaning medium from the inlets 44, 46 to the outlet 42 arises.

Alternatively or in addition to the suction assembly, a pump assembly may be provided as a pressurization device, with which the cleaning medium is pumped with overpressure into the inner space 18.

The flow device 34 is configured such that the cleaning medium flowing in the inner space 18 forms a vortex flow at least in sections. In particular, the cleaning medium (FIG. 4) can flow tangentially through the inlets 44, 46 in relation to the axis 32. Here, the cleaning medium first flows along the side wall 24 on its side facing toward the inner space 18.

As a result of the central suctioning of the cleaning medium through the outlet 42, the flow of the cleaning medium is curved in the direction of the axis 32 (arrows 54 in FIGS. 1, 2, and 4). A deflection of the cleaning medium in the axial direction (arrows 56 in FIGS. 1 and 2) additionally takes place as a result of the axial suctioning.

It is shown in practice that as a result of the vortex flow of the cleaning medium created in the inner space 18, particulate contamination superficially adhering to the component 28 can be struck particularly well and be carried with the cleaning medium. Dots in the illustration symbolize contamination, the component 28 being depicted in FIGS. 3 and 4 before and during the cleaning, respectively.

The cleaning apparatus 10 further comprises a separating device 58. The separating device 58 is arranged on the cleaning chamber 12. The separating device 58 comprises an outlet opening 60 arranged on the wall arrangement 16 and, in particular, on the side wall 24, as well as a separation space 62. The separating device 58 further comprises a collection container 64 for separated particles.

The outlet opening 60 is presently of slit-shaped configuration and is formed by two portions 66, 68 arranged radially at a distance from one another in a corresponding manner to the inlets 44, 46. The side wall 24 thus forms a step 70 between the portions 66, 68.

The outlet opening 60 presently extends from the base wall 20 to the top wall 22 and is axially extended. The outlet opening 60 is arranged approximately in the middle between the inlets 44 and 46 in the circumferential direction around the axis 32 (FIGS. 3 and 4).

Particles that have been detached from the component 28 can flow through the outlet opening 60. The particles that are first guided along the side wall 24 by the vortex flow can be transferred tangentially out of the inner space 18 into the separation space 62. In the present case, the separation space 62 comprises a wall arrangement 72. The wall arrangement 72 is advantageously formed in one piece with the side wall 24, such that the separation space 62 can be seen as a sort of "extension" or "continuation" of the cleaning chamber 12.

The top wall 22 also closes the separation space 62 at the top.

The separation space 62 is designed such that inflowing particles are slowed down on the wall arrangement 72 and thereby lose their kinetic energy. A backflow of particles back into the inner space 18 can be largely avoided, because the backflow would have to be directed opposite the feed stream through the outlet opening 60.

The separation space 62 is a dead space in which the previously slowed particles sink to the bottom due to gravity. The collection container 64 is arranged on the bottom side of the wall arrangement 72. The particles can be collected in the collection container 64. The collection container 64 can be released from the separating device 58 and be emptied.

Figure 5:
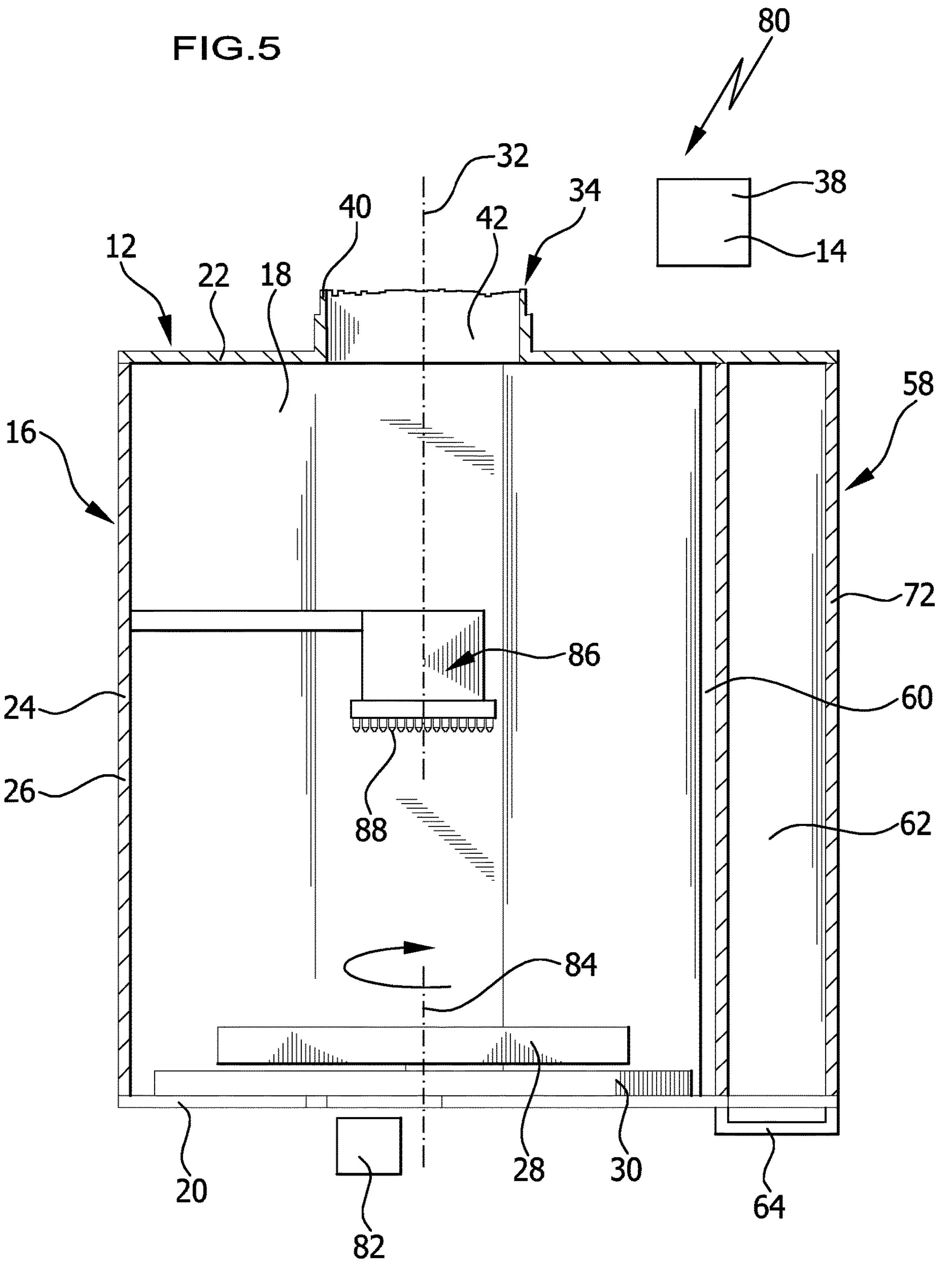
FIG. 5: shows a schematic partial cut depiction of a cleaning chamber of a cleaning apparatus in accordance with the invention in a further preferred embodiment.
Figure 6:
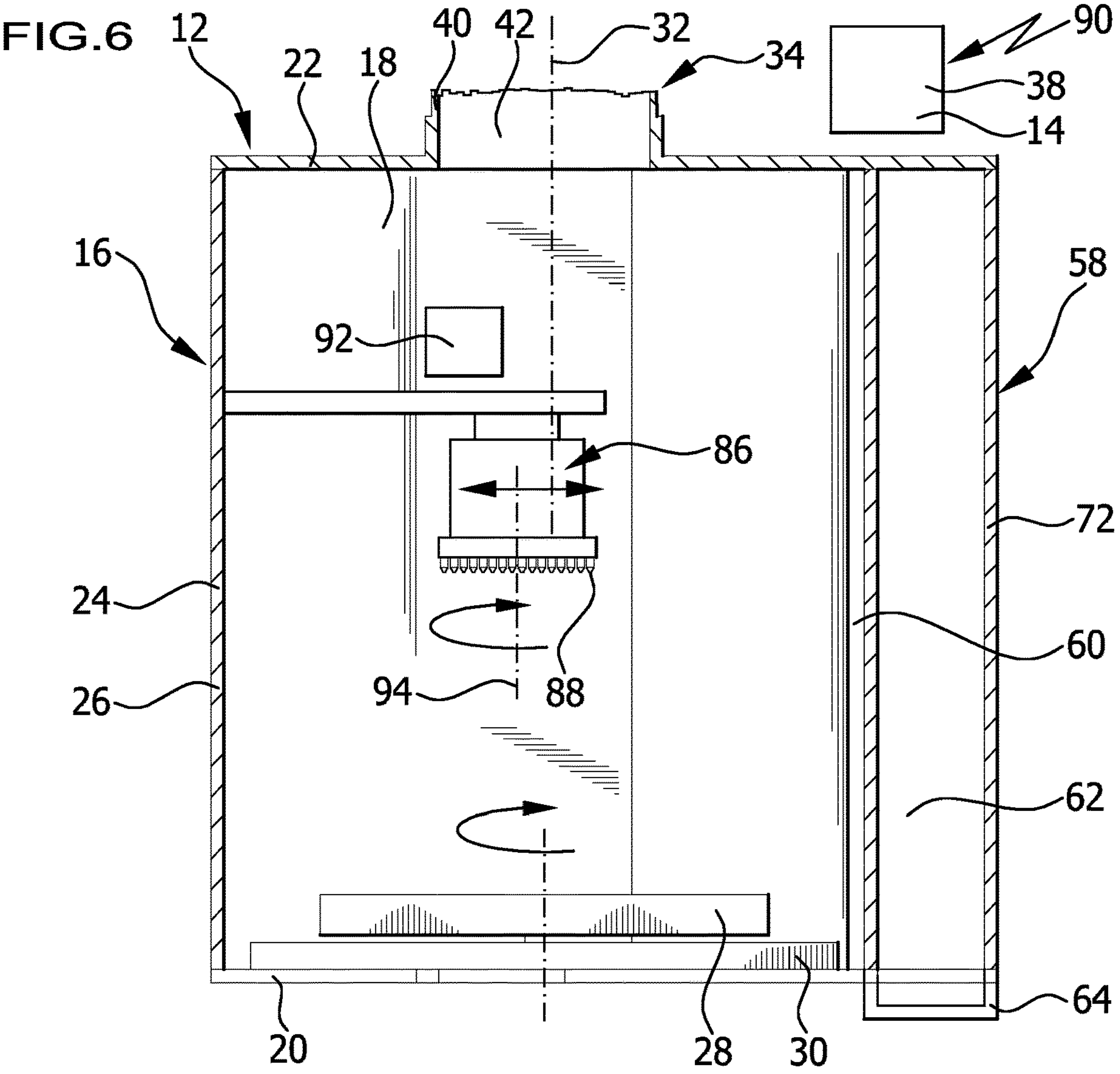
FIG. 6: shows a schematic partial cut depiction of a cleaning chamber of a cleaning apparatus in accordance with the invention in a further preferred embodiment.
Figure 7:
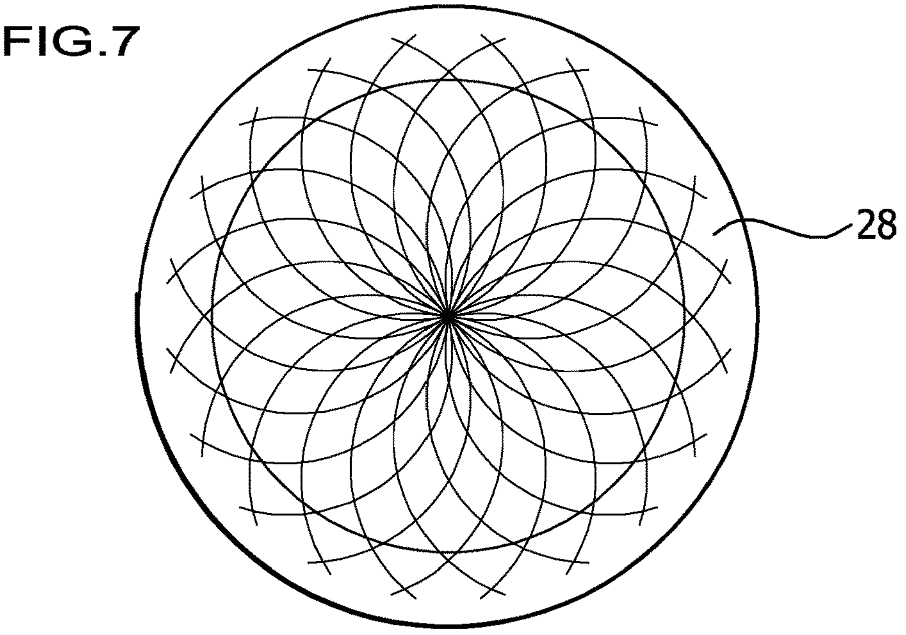
FIG. 7: shows as an example a plan view of a component to be cleaned, with a pattern of action resulting during a relative rotation of a nozzle device and the component about mutually different axes of rotation.

Before the further cleaning apparatuses depicted in FIGS. 5, 6, and 7 are explained, reference is made again to the preceding statements regarding the numerous optional and advantageous features of the cleaning apparatus in accordance with the invention. These optional features can each be provided individually or in combination and, in particular, in any combination with one another in one of the advantageous embodiments of the cleaning apparatus described on the basis of the drawing. To avoid repetition, reference is made to what has already been said.

In the advantageous embodiments of the cleaning apparatus in accordance with the invention described in the following, identical reference numerals are used for identical or equivalent features and components. The advantages that can achieved with the cleaning apparatus 10 can also be achieved with the further cleaning apparatuses, such that reference may be made to the preceding remarks in this regard in order to avoid repetition.

The cleaning apparatus 80 in accordance with FIG. 5 comprises an adjusting device 82 for moving the component 28. For example, by means of the adjusting device 82, the receptacle 30 is rotatable about an axis of rotation 84 and thus the component 28 is also rotatable.

For acting on the component 28 in a targeted manner, the cleaning apparatus 80 further comprises a nozzle device 86. The nozzle device 86 may comprise a plurality of nozzle elements 88. By way of the nozzle elements 88, for example, a gaseous or liquid cleaning fluid can be applied to the component 28 in order to detach particles adhering thereto.

The cleaning apparatus 90 schematically depicted in FIG. 6 differs from the cleaning apparatus 80 to the extent that an adjusting device 92 is also associated with the nozzle device 86. The adjusting device 92 enables, e.g., the rotation of the nozzle device 86 about an axis of rotation 94. Provision may hereby be made that the axes of rotation 84, 94 are different from one another, preferably being aligned in parallel to one another. In this way, a pattern of action schematically depicted in FIG. 7 can be achieved on the surface of the component 28 as a result of the overlapping rotational movements of the component 28 and the nozzle device 86, with a view to a cleaning of the component 28 that is as comprehensive as possible.

Further preferably, by means of the adjusting device 82 and/or 92, a translational movement of the component 28 or the nozzle device 82 can be performed, as is schematically depicted in FIG. 6 with the nozzle device 86.

Figure 8:
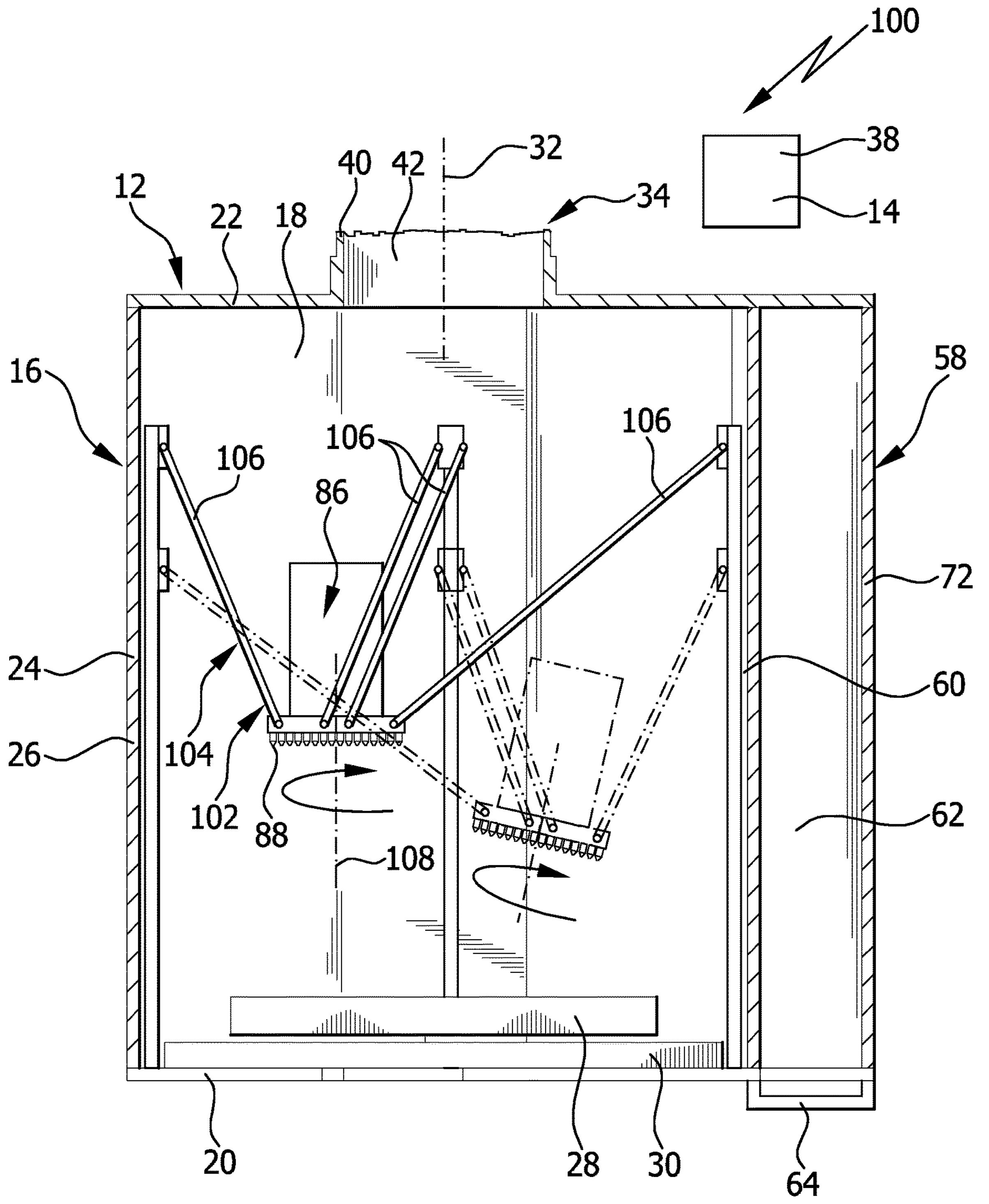
FIG. 8: shows a schematic partial cut depiction of a cleaning chamber of a cleaning apparatus in accordance with the invention in a further preferred embodiment.

The cleaning apparatus schematically depicted in FIG. 8 and denoted with the reference numeral 100 also has a nozzle device 86. To move said nozzle device 86, an adjusting device 102 is provided, which is presently of robotic configuration. For example, the adjusting device 102 comprises a so-called delta robot 104. The delta robot 104 may, for example, comprise a plurality of position-variable and/or length-variable support elements 106 for the nozzle device 86. This makes it possible to position the nozzle device 86 in the inner space 18 such that discharged cleaning fluid can be directed at the component 28 in a targeted manner. In particular, a rotation of the nozzle device 86, presently depicted as a rotation about an axis of rotation 108, and/or a translational movement in preferably three spatial directions is preferably possible independently of one another.

REFERENCE NUMERAL LIST

10, 80, 90, 100 cleaning apparatus
12 cleaning chamber
14 pressurization device
16 wall arrangement
18 inner space
20 base wall
22 top wall
24 side wall
26 shell
28 component
30 receptacle
32 axis
34 flow device
38 suction assembly
40 flow channel
42 outlet
44, 46 inlet
48, 50 portion
52 step
54, 56 arrow
58 separating device
60 outlet opening
62 separation space
64 collection container
66, 68 portion
70 step
72 wall arrangement
82 adjusting device
84 axis of rotation
86 nozzle device
88 nozzle element
92 adjusting device
94 axis of rotation
102 adjusting device
104 delta robot
106 support element
108 axis of rotation

The invention claimed is:

1. Cleaning apparatus for cleaning components by means of a gaseous cleaning medium, comprising a cleaning chamber with an inner space and a wall arrangement enclosing same, a receptacle for the component in the inner space, and a flow device for the cleaning medium, which comprises a pressurization device and comprises or forms at least one inlet into the inner space and at least one outlet from the inner space, wherein a pressure difference between the at least one inlet and the at least one outlet is providable by means of the flow device, and wherein the flow device is formed such that the cleaning medium forms a vortex flow at least in sections in the inner space from the at least one inlet to the at least one outlet, wherein the cleaning apparatus comprises a separating device for particles that are detached from the component and carried by the cleaning medium, and wherein formed in the wall arrangement is at least one outlet opening for particles, by way of which the inner space opens into a separation space for the particles, said separation space comprising a wall arrangement.

2. Cleaning apparatus in accordance with claim 1, wherein the cleaning chamber is of cylindrical or substantially cylindrical configuration, wherein the wall arrangement comprises a base wall, a top wall, and a circumferential side wall.

3. Cleaning apparatus in accordance with claim 1, wherein a wall arrangement of the cleaning chamber is made of at least one of an electrically conductive material and an abrasion-resistant material.

4. Cleaning apparatus in accordance with claim 1, wherein the receptacle is arranged on a wall of the cleaning chamber, the wall being opposite to a wall in which the at least one outlet is formed.

5. Cleaning apparatus in accordance with claim 1, wherein the pressurization device is or comprises at least one of the following:

a suction assembly for acting upon the inner space with underpressure by way of the at least one outlet;

an overpressure device for acting upon the inner space with overpressure by way of the at least one inlet.

6. Cleaning apparatus in accordance with claim 1, wherein the at least one inlet is arranged or formed on a side wall of the cleaning chamber.

7. Cleaning apparatus in accordance with claim 1, wherein two or more inlets are provided, wherein a plurality of the two or more inlets are positioned at uniform angular distances from another in relation to an axis of the cleaning chamber.

8. Cleaning apparatus in accordance with claim 1, wherein the at least one inlet is of slit-shaped configuration, is at least one of adapted to be flowed through tangentially by the entering cleaning medium, in relation to an axis defined by the cleaning chamber, and extended axially in relation to the axis, and causes the flow of the cleaning medium in the inner space to run along the wall arrangement of at least one of the cleaning chamber and centrally around the axis.

9. Cleaning apparatus in accordance with claim 1, wherein the at least one outlet opening is arranged or formed on a side wall of the cleaning chamber and is of slit-shaped configuration.

10. Cleaning apparatus in accordance with claim 1, wherein the at least one outlet opening is at least one of adapted to be flowed through tangentially by the particles, in relation to an axis defined by the cleaning chamber, and extended axially in relation to the axis.

11. Cleaning apparatus in accordance with claim 1, wherein the separating device is of at least one of inertia-based and filterless configuration.

12. Cleaning apparatus in accordance with claim 1, wherein the separating device comprises a collection container for separated particles.

13. Cleaning apparatus in accordance with claim 1, wherein the cleaning apparatus comprises at least one of an adjusting device for moving the component and a vibration device for vibrating the component indirectly or directly.

14. Cleaning apparatus in accordance with claim 13, wherein at least one of the adjusting device and the vibration device is arranged on a base wall of the cleaning chamber, on which the receptacle is positioned, and/or wherein the base wall is rotatable by means of the adjusting device.

15. Cleaning apparatus in accordance with claim 1, wherein the cleaning apparatus comprises a nozzle device with at least one nozzle element arranged in the inner space, which is adapted to be acted upon with a cleaning fluid.

16. Cleaning apparatus in accordance with claim 15, wherein the at least one nozzle element is directed or directable at the component.

17. Cleaning apparatus in accordance with claim 15, wherein an adjusting device for moving the nozzle device relative to the component is provided, wherein the adjusting device is configured for at least one of a translational and rotational movement of the nozzle device.

18. Cleaning apparatus in accordance with claim 1, wherein the cleaning apparatus comprises at least one mechanical cleaning tool in the inner space for mechanically cleaning the component.

19. Cleaning apparatus for cleaning components by means of a gaseous cleaning medium, the cleaning apparatus comprising:

a cleaning chamber with an inner space and a wall arrangement enclosing same, a receptacle for the component in the inner space, and a flow device for the cleaning medium, which comprises a pressurization device and comprises or forms at least one inlet into the inner space and at least one outlet from the inner space;

wherein a pressure difference between the at least one inlet and the at least one outlet is providable by means of the flow device;

wherein the flow device is formed such that the cleaning medium forms a vortex flow at least in sections in the inner space from the at least one inlet to the at least one outlet;

wherein two or more inlets are provided; and wherein a plurality of the two or more inlets are positioned at uniform angular distances from another in relation to an axis of the cleaning chamber.

20. Cleaning apparatus for cleaning components by means of a gaseous cleaning medium, the cleaning apparatus comprising a cleaning chamber with an inner space and a wall arrangement enclosing same, a receptacle for the component in the inner space; and a flow device for the cleaning medium, which comprises a pressurization device and comprises or forms at least one inlet into the inner space and at least one outlet from the inner space;

wherein a pressure difference between the at least one inlet and the at least one outlet is providable by means of the flow device; and wherein the flow device is formed such that the cleaning medium forms a vortex flow at least in sections in the inner space from the at least one inlet to the at least one outlet;

wherein the at least one inlet is of slit-shaped configuration, is at least one of adapted to be flowed through tangentially by the entering cleaning medium, in relation to an axis defined by the cleaning chamber, and extended axially in relation to the axis, and causes the flow of the cleaning medium in the inner space to run along the wall arrangement of at least one of the cleaning chamber and centrally around the axis.

21. Cleaning apparatus for cleaning components by means of a gaseous cleaning medium, the cleaning apparatus comprising:

a cleaning chamber with an inner space and a wall arrangement enclosing same;

a receptacle for the component in the inner space; and a flow device for the cleaning medium, which comprises a pressurization device and comprises or forms at least one inlet into the inner space and at least one outlet from the inner space;

wherein a pressure difference between the at least one inlet and the at least one outlet is providable by means of the flow device, and wherein the flow device is formed such that the cleaning medium forms a vortex flow at least in sections in the inner space from the at least one inlet to the at least one outlet;

wherein the cleaning apparatus comprises a separating device for particles that are detached from the component and carried by the cleaning medium; and wherein the separating device is of at least one of inertia-based and filterless configuration.

22. Cleaning apparatus for cleaning components by means of a gaseous cleaning medium, the cleaning apparatus comprising a cleaning chamber with an inner space and a wall arrangement enclosing same, a receptacle for the component in the inner space, and a flow device for the cleaning medium, which comprises a pressurization device and comprises or forms at least one inlet into the inner space and at least one outlet from the inner space;

wherein a pressure difference between the at least one inlet and the at least one outlet is providable by means of the flow device, and wherein the flow device is formed such that the cleaning medium forms a vortex flow at least in sections in the inner space from the at least one inlet to the at least one outlet;

wherein the cleaning apparatus comprises a separating device for particles that are detached from the component and carried by the cleaning medium; and wherein the separating device comprises a collection container for separated particles.

23. Cleaning apparatus for cleaning components by means of a gaseous cleaning medium, the cleaning apparatus comprising a cleaning chamber with an inner space and a wall arrangement enclosing same, a receptacle for the component in the inner space, and a flow device for the cleaning medium, which comprises a pressurization device and comprises or forms at least one inlet into the inner space and at least one outlet from the inner space;

wherein a pressure difference between the at least one inlet and the at least one outlet is providable by means of the flow device, and wherein the flow device is formed such that the cleaning medium forms a vortex flow at least in sections in the inner space from the at least one inlet to the at least one outlet;

wherein the cleaning apparatus comprises at least one of an adjusting device for moving the component and a vibration device for vibrating the component indirectly or directly.

24. Cleaning apparatus for cleaning components by means of a gaseous cleaning medium, the cleaning apparatus comprising a cleaning chamber with an inner space and a wall arrangement enclosing same, a receptacle for the component in the inner space, and a flow device for the cleaning medium, which comprises a pressurization device and comprises or forms at least one inlet into the inner space and at least one outlet from the inner space, wherein a pressure difference between the at least one inlet and the at least one outlet is providable by means of the flow device, and wherein the flow device is formed such that the cleaning medium forms a vortex flow at least in sections in the inner space from the at least one inlet to the at least one outlet, wherein the cleaning apparatus comprises a nozzle device with at least one nozzle element arranged in the inner space, which is adapted to be acted upon with a cleaning fluid.

* * * * *